Patented June 27, 1933                                                    1,915,438

UNITED STATES PATENT OFFICE

FRIEDRICH MUTH, OF LEVERKUSEN NEAR COLOGNE-ON-THE-RHINE, GERMANY, ASSIGNOR TO GENERAL ANILINE WORKS, INC., OF NEW YORK, N. Y., A CORPORATION OF DELAWARE

AZO DYESTUFF

No Drawing. Application filed March 26, 1931, Serial No. 525,625, and in Germany April 1, 1930.

The present invention relates to new water insoluble azo dyestuffs, more particularly it relates to dyestuffs which are obtainable by coupling either in substance or on a substratum or on the fibre a diazotized amino compound capable of producing an azo dyestuff which amine itself may contain an azo bridge with an arylamide of a 2-hydroxyphenanthrene-3-carboxylic acid or of a 3-hydroxyphenanthrene-2-carboxylic acid, the components being selected in such a manner that none of them contains the sulfonic acid or carboxylic acid groups. As amines coming into consideration for the purpose of this invention there may be mentioned by way of example amines of the benzene and naphthalene series, amino carbazoles, amino diphenylene-oxide etc.

My new azo dyestuffs may be represented by the probable general formula

wherein R stands for the residue of a diazotization component capable of producing an azo dyestuff, one X stands for a hydroxy group and the other X stands for the group CONH.aryl and wherein the nuclei may be substituted with the exception of a sulfonic acid or carboxylic acid group, for example by alkyl, oxalkyl, alkyl-hydroxy, halogen, the nitro group etc., and wherein $n$ represents one of the numbers 1 and 2, the azo bridge being attached to the phenanthrene nucleus in ortho position to the hydroxy group.

The method of manufacture of the hydroxy phenanthrene o-carboxylic acids is described by Werner, in "Berichte der Deutschen Chemischen Gesellschaft", vol. 35, page 4423.

The arylides of these acids are for instance obtainable by condensing at boiling temperature in an inert organic solvent or diluent, such as toluene or xylene in the presence of a condensing agent such as phosphorous oxychloride, the hydroxyphenanthrene-o-carboxylic acid and the aromatic base.

The new dyestuffs possess the most varied shades, depending on the specific amine used which shades when produced on the fibre exhibit good fastness properties.

The invention is illustrated by the following examples, without limiting it thereto:—

Example 1.—Well boiled and dried cotton yarn is impregnated with a solution consisting of 3.4 grams of 2-hydroxyphenanthrene-3-carboxylic acid -o-toluidide, 6 ccs. of caustic soda lye of 34° Bé. and 6 ccs. of Turkey red oil per litre, wrung out and without drying developed in a diazo solution, the free acid of which has been neutralized by means of sodium acetate and which contains 2 grams of 2.5-dichloroaniline per litre, then washed and soaped. In this manner a fast yellowish red is obtained, the dyestuff having the following formula:

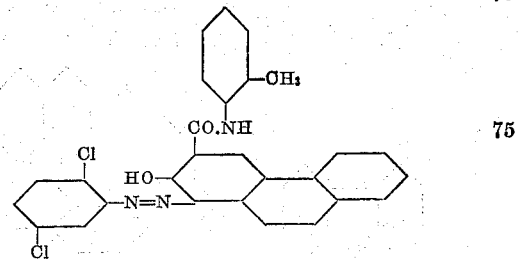

The 2-hydroxyphenanthrene-3-carboxylic acid-o-toluidide yields with:—4-nitraniline, a brown; 5-nitro-o-anisidine, a reddish violet; 5-chloro-2-toluidine, a Bordeaux red; m-amino-azo-toluene

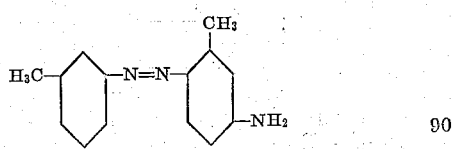

a brown; 2-amino-5-benzoylamino-hydroquinone diethylether, a navy blue; dianisidine, a reddish blue; 1-aminocarbazole, a violet-brown; 2-aminocarbazole, a black; 9-ethyl-3-aminocarbazole, a black; 2-aminodiphenylene-oxide, a reddish-brown.

Example 2.—In an analogous manner to that of Example 1, the 3-hydroxyphenanthrene-2-carboxylic acid-o-toluidide yields with 2.5-dichloro-aniline a dyestuff of the formula

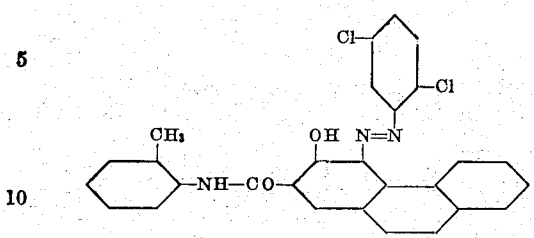

said dyestuffs dyeing Bordeaux red shades; the same coupling component yields with:— 2-nitroaniline, a brown; 5-chloro-o-toluidine, a Bordeaux red; 5-nitro-o-anisidine, a greenish black; m-amino-azo-toluene, a blackish-brown; 2-amino-5-benzoylamino-hydroquinone-diethylether, a greenish-blue; 1-aminocarbazole, a violet brown; 2-aminocarbazole, a black; 3-aminocarbazole, a black; 2-aminodiphenylene-oxide, a violet brown.

*Example 3.*—In an analogous manner to that of Example 1, the 3-hydroxyphenanthrene-2-carboxylic acid para-anisidide yields with:—5-nitro-2-anisidine, a reddish-black; 4-nitro-o-toluidine, a Bordeaux red; 2.5-dichloro-aniline, a Bordeaux red; 4-chloro-o-nitroaniline, a brown; 3-nitro-p-toluidine, a brown; 4-nitro-2-5-dimethoxy-4'-aminoazobenzene, a greenish-black; 2-aminocarbazole, a black.

*Example 4.*—In an analogous manner to that described in Example 1, the 2-hydroxyphenanthrene-3-carboxylic acid-β-naphthylamide yields with 2-aminocarbazole a black, the dyestuff having the following formula:—

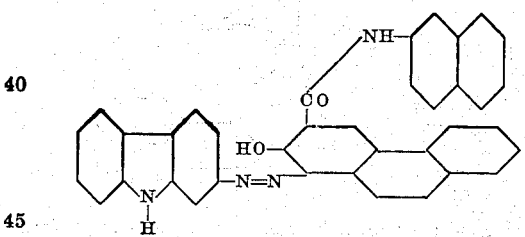

I claim:—

1. As new products azo dyestuffs of the probable general formula

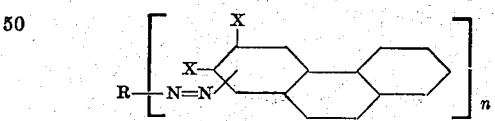

wherein *n* stands for one of the numbers 1 and 2, R stands for the residue of a diazotization component capable of forming an azo dyestuff, one X stands for a hydroxy group and the other X stands for the group —CO.NH.aryl, the azo bridge being attached to the phenanthrene nucleus in ortho position to the hydroxy group and wherein all nuclei may be substituted by substituents of the group consisting of alkyl, oxalkyl, alkoxy, halogen and the nitro group, being various colored powders and yielding when produced on the fibre the most varied shades of good fastness properties.

2. As new products azo dyestuffs of the probable general formula

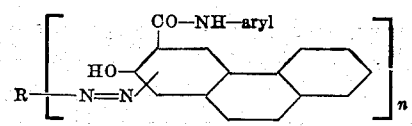

wherein *n* stands for one of the numbers 1 and 2, R stands for the residue of a diazotization component capable of forming an azo dyestuff, "aryl" stands for an aromatic residue of the benzene or naphthalene series and wherein all nuclei may be substituted by substituents of the group consisting of alkyl, oxalkyl, alkoxy, halogen and the nitro group, being various colored powders and yielding when produced on the fibre the most varied shades of good fastness properties.

3. As a new product the dyestuff of the formula

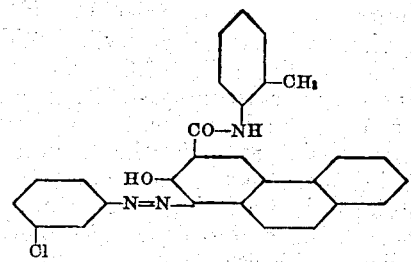

yielding when produced on the fibre yellow red shades of good fastness properties.

4. As new products azo dyestuffs of the probable general formula

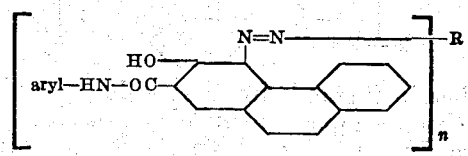

wherein *n* stands for one of the numbers 1 and 2, R stands for the residue of a diazotization component capable of forming an azo dyestuff, "aryl" stands for an aromatic residue of the benzene or naphthalene series and wherein all nuclei may be substituted by substituents of the group consisting of alkyl, oxalkyl, alkoxy, halogen and the nitro group, being various colored powders and yielding when produced on the fibre the most varied shades of good fastness properties.

5. As a new product the dyestuff of the formula

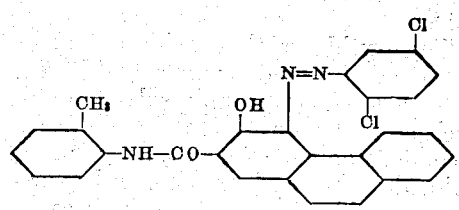

yielding when produced on the fibre Bordeaux red shades of good fastness properties.

6. Fiber dyed with a dyestuff as claimed in claim 1.

7. Fiber dyed with a dyestuff as claimed in claim 2.

8. Fiber dyed with a dyestuff as claimed in claim 3.

9. Fiber dyed with a dyestuff as claimed in claim 4.

10. Fiber dyed with a dyestuff as claimed in claim 5.

In testimony whereof, I affix my signature.

FRIEDRICH MUTH.